(No Model.)

3 Sheets—Sheet 1.

C. E. BUELL.
AUTOMATIC SWITCH FOR SECONDARY BATTERIES.

No. 251,179. Patented Dec. 20, 1881.

Witnesses.
F. L. Ourand
Phil. W. Hale

Inventor,
Charles E. Buell,
by W. B. Hale,
Attorney.

N. PETERS, Photo-Lithographer, Washington, D. C.

(No Model.)

C. E. BUELL.
AUTOMATIC SWITCH FOR SECONDARY BATTERIES.

No. 251,179. Patented Dec. 20, 1881.

Witnesses,
F. L. Durand
Phil. W. Hale

Inventor,
Charles E. Buell
by W. B. Hale
Attorney.

UNITED STATES PATENT OFFICE.

CHARLES E. BUELL, OF NEW HAVEN, CONNECTICUT.

AUTOMATIC SWITCH FOR SECONDARY BATTERIES.

SPECIFICATION forming part of Letters Patent No. 251,179, dated December 20, 1881.

Application filed July 27, 1881. (No model.)

*To all whom it may concern:*

Be it known that I, CHARLES E. BUELL, a citizen of the United States of America, residing at New Haven, in the county of New Haven and State of Connecticut, have invented certain new and useful Improvements in Automatic Switches for Secondary Batteries; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of this invention is, first, to automatically, at predetermined periods, connect one or more series of secondary electric batteries to a primary battery or batteries in multiple arc for the purpose of charging the former, and at other periods to automatically disconnect said secondary batteries from the primary and connect them in series to a circuit over which their current is to be applied to use; and it has the further object to utilize for charging one or more series of secondary batteries a primary-battery circuit which is at the same time used for another and independent purpose, and without interrupting the continuity of said primary circuit.

Figure 1:
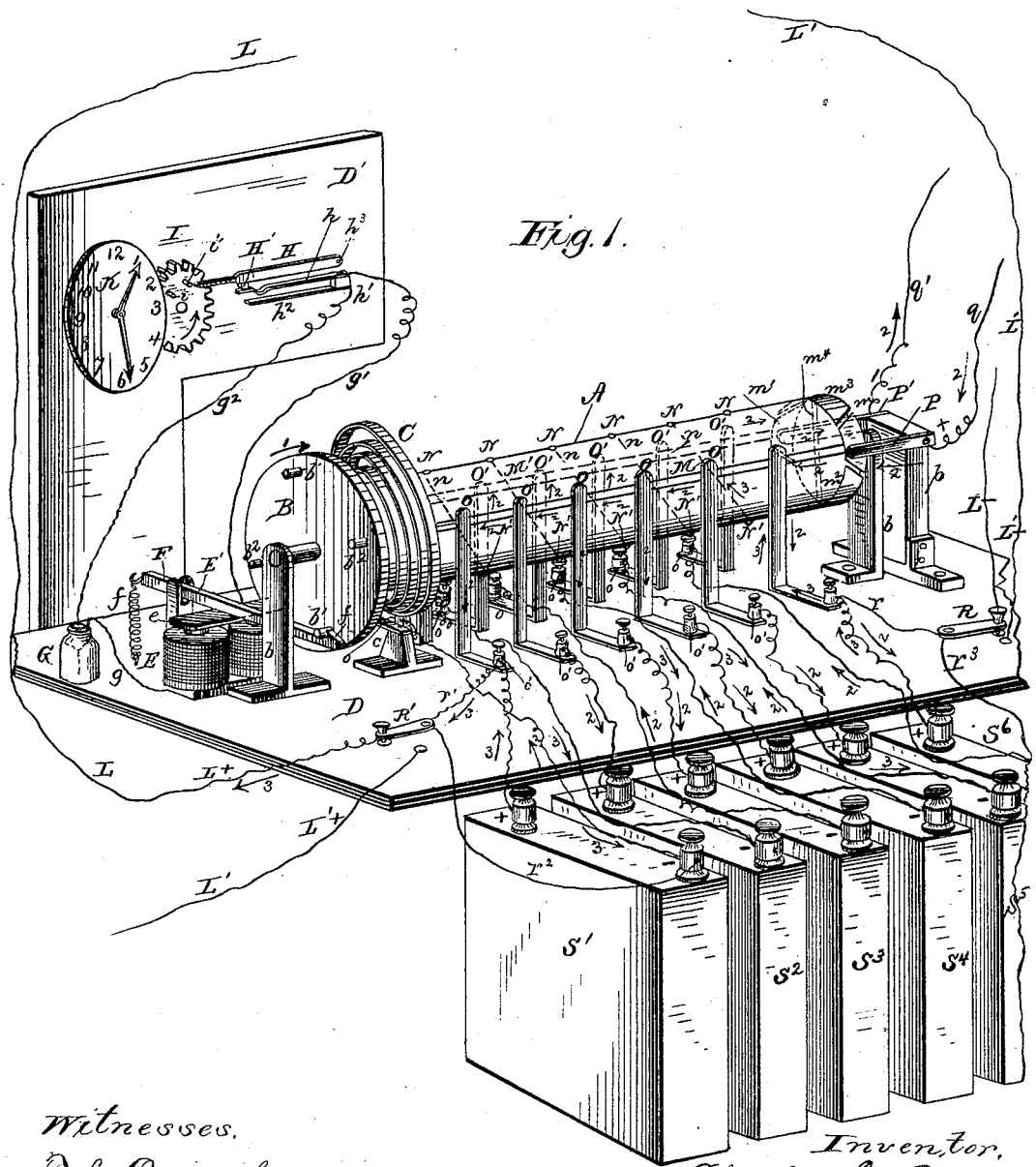
Figure 2:
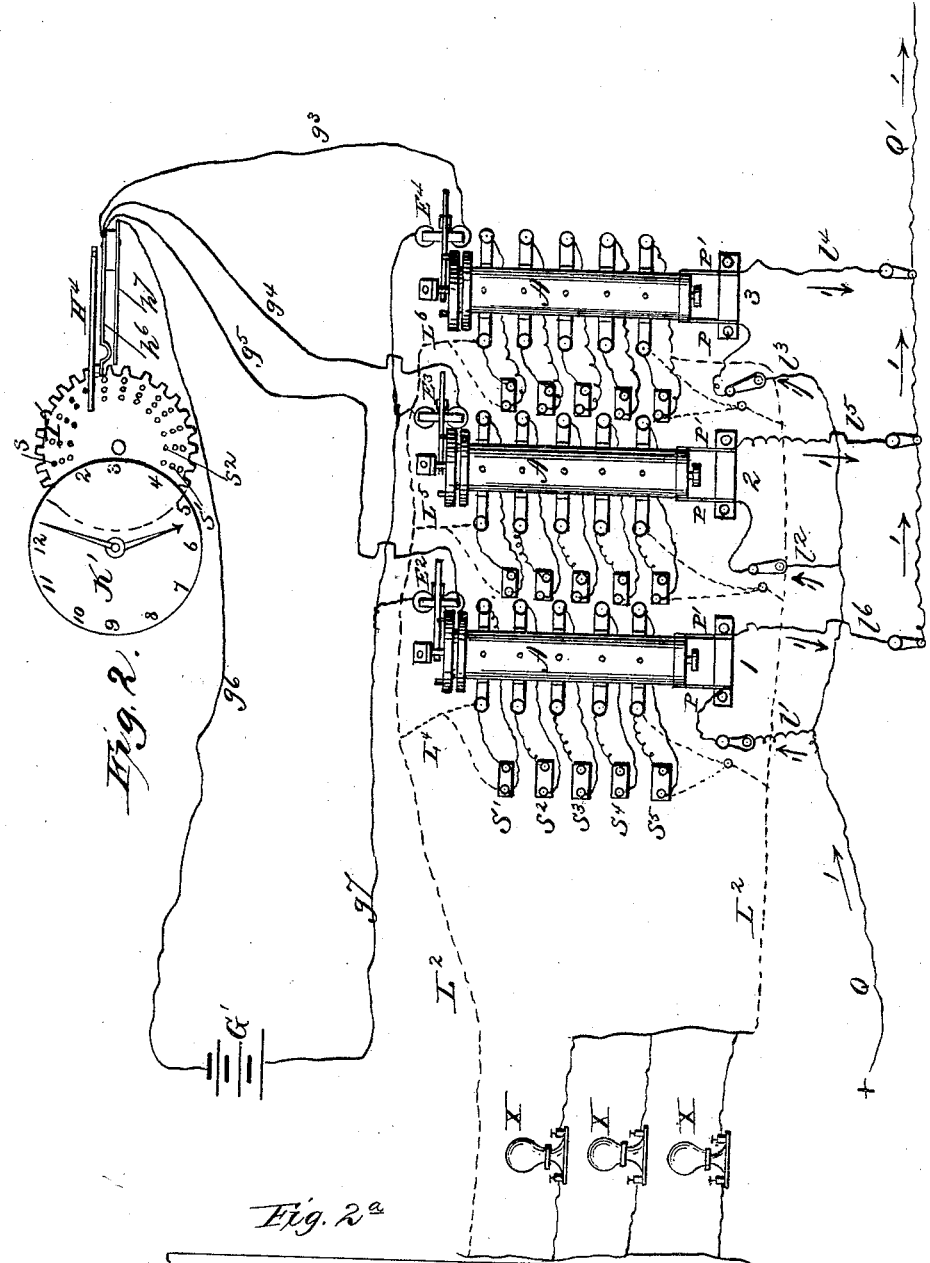
Figure 3:
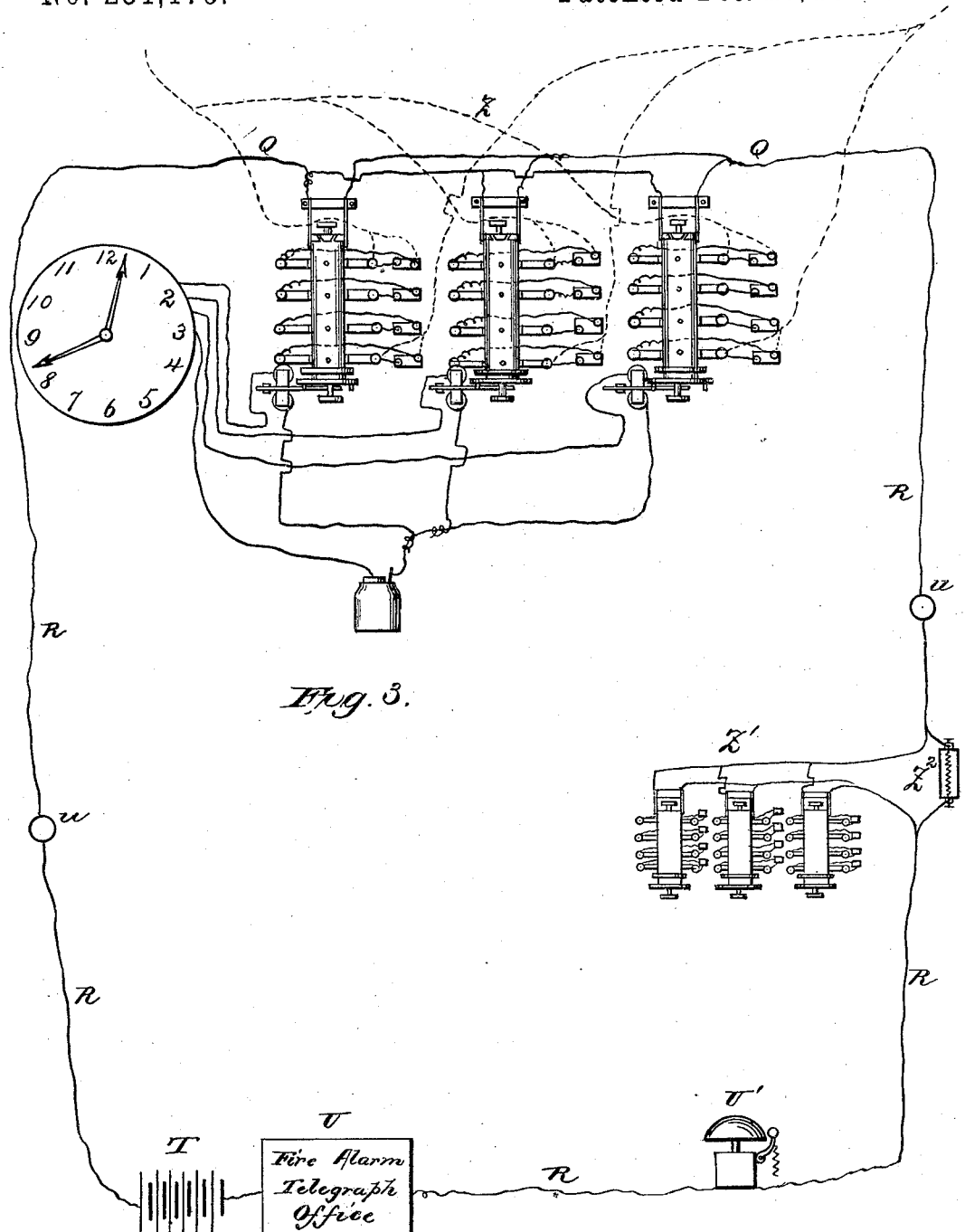

In the accompanying drawings, Figure 1 is a perspective view of an automatic connecting and disconnecting apparatus constructed according to my invention and applied to a single series of secondary batteries and a primary charging-circuit, and provided with switches by which the currents of the secondary batteries in series may be directed over either of two independent circuits. Fig. 2 is a diagram illustrating the manner of using three of the connecting and disconnecting apparatuses with a single primary charging-circuit and a single circuit for the current of the several series of the secondary batteries to traverse successively. Fig. 2$^a$ is a plan view of a multiple-circuit closing device adapted for use in connection with three series of secondary batteries and their connecting and disconnecting devices. Fig. 3 is a diagram illustrating the manner of utilizing for charging one or more series of secondary batteries a battery-circuit which is normally closed and used as a fire-alarm circuit.

Referring to Fig. 1, the letter A indicates a cylinder of non-conducting material, provided at its opposite ends with journals having their bearings in posts $b$ $b$. Concentrically upon one end of this cylinder is fixed a disk, B, having near its outer edge four pins, $b'$ $b^2$, equidistant from each other. Behind the disk B a volute spring, C, surrounds the cylinder, having its inner end attached to the same and its outer end secured to a stud, $c$, arranged upon the base D. If the cylinder be turned in the direction of the arrow No. 1, the spring will be wound up, and it will then throw the cylinder in the opposite direction if said cylinder be left free.

The letter E designates an electro-magnet arranged upon the base D, and having its armature $e$ secured to a lever, E', having one end provided with a beveled edge catch, $f$, and its other end connected to the base D by a spring, $f'$, arranged to draw it downward and throw said catch upward in the path of the pins $b'$, the lever being pivoted in a post, F. One terminal of the coils of the magnet E is connected by a wire, $g$, with one pole of the battery G, and the other terminal is connected by a wire, $g'$, with a spring, $h$, secured to an insulating-block, $h'$, arranged upon the front of a vertical board, D', rising from the base D, while the other pole of the battery G is connected by a wire, $g^2$, with a spring, $h^2$, secured to the opposite side of the insulating-block and lying directly under, but not in contact with, the spring $h$. Directly over the said spring $h$ lies an arm, H, having one end pivoted on a pin, $h^3$, and its other end extended in the form of a tongue, the tip of which stands in the path of pins $i$ and $i'$, projecting from a toothed wheel, I, which is in gear with the train of a clock, K. The arm H is provided with a hammer, H', which normally rests upon the tip of the spring $h$, but not with sufficient weight of itself to force said spring in contact with the spring $h^2$; but if the arm H be raised a short distance and allowed to fall, its momentum will cause the hammer H' to drive the spring $h$ into momentary contact with the spring $h^2$, this contact being immediately broken by the resilience of the spring $h$, causing it to resume its normal position.

It will be observed that the springs $h$ and $h^2$ are terminals of the circuit of the battery G, and when they are brought in contact said circuit will be closed and the electro-magnet E caused to attract its armature, drawing downward the lever E' and releasing the pin $b'$, with which the catch $f$ may be at the moment engaged. The closing of the circuit being exceedingly brief when effected by the fall of the arm H, as before stated, the spring $f'$ will throw the catch $f$ upward again in time to engage the following pin as the cylinder A is rotated by the action of the spring C, which should be of sufficient length to cause the cylinder to make several complete rotations after being once wound up. Let us now suppose that the wheel I is so geared with the train of the clock as to make one revolution every eight hours, and that the pins $i$ and $i'$ upon said wheel are two hours apart, and it will appear that during six hours the cylinder will be left stationary. At the end of that time, the wheel revolving in the direction of the arrow, the first pin, $i$, will raise the arm H, and then, passing from under it, drop it, so that the hammer H' will strike the spring $h$, driving it into momentary contact with the spring $h^2$ and closing the battery-circuit, so that the catch $f$ will release the pin $b'$ and be immediately retracted to engage the following pin, $b^2$, the cylinder A being thus caused to make one-fourth of a revolution. Then at the end of two hours the second pin, $i'$, will act upon the arm H in like manner, and the cylinder will be caused to make another quarter-revolution, after which it will be left in repose six hours longer.

On diametrically-opposite portions of the cylinder A are arranged longitudinally metallic strips M and M', the latter being shown in dotted lines, said strips terminating at their rear ends in metallic plates $m$ and $m'$, partially encircling the end of the cylinder, and separated by narrow oblique spaces from plates $m^2$ and $m^3$, which are arranged upon the intervening portions of the cylinder, and connected by a wire, $m^4$, (shown in dotted lines as lying across the rear end of the cylinder.)

Half-way between the strips M and M', upon opposite portions of the surface of the cylinder, are arranged two longitudinal series of metallic buttons, N and N', the buttons of each series being respectively directly opposite those of the other, and said buttons being connected in pairs by metallic wires or rods $n$, passing obliquely through the cylinder, so that each button N is not connected to a directly opposite button, N', but with a button, N', one space nearer the rear end of the cylinder, this being for a purpose which will presently appear. The rear end button, N, and the front end button, N', are not connected with other buttons.

Arranged upon the base D, on opposite sides of the cylinder A, are upright metallic springfingers O and O', the tops of which bear against the surface of the said cylinder, and when said cylinder is held in position by the engagement of a pin, $b'$, with the catch $f$ said fingers will bear respectively upon the metallic strips M and M'; but when said cylinder is held by a pin, $b^2$, the fingers will bear respectively upon the buttons N and N'. The lower portions of the fingers O and O' are bent to form bases $o$, resting upon the base D, and having binding-posts $o'$ mounted thereupon.

The letters S' S², &c., designate a series of secondary electric batteries, which may be of any suitable construction, and the positive poles + of said secondary batteries are connected by suitable wires with the binding-posts of the metallic fingers O, while the negative poles − of said batteries are similarly connected with the binding-posts of the metallic fingers O'.

The letters P and P' denote metallic springs, supported by an insulating-block, $p$, and having their free ends bearing upon opposite sides of the end of the cylinder, so that the tips of said springs will be alternately in contact with the plates $m$ $m'$ and $m^2$ and $m^3$ when the cylinder revolves. From the spring P a wire, $q$, leads to the positive pole of a primary charging-battery, (not shown in the drawings,) and from the spring P' a wire, $q'$, leads to the negative pole of said battery. From the rear end finger of the series of fingers O a wire, $r$, leads to a hand-switch, R, arranged to connect said wire with either of two circuits the terminals only of which are indicated by the wires L− and L'−, and from the front end finger of the series of the metallic fingers O a wire, $r'$, leads to a hand-switch, R', arranged to connect said wire also with either of the two circuits the terminals of which are indicated by wires L+ and L'+.

The hand-switch R' is connected by a wire, $r^2$, with the negative pole of secondary battery S', and the switch R is connected by a wire, $r^3$, with the negative pole of battery S⁶.

The apparatus now described is used as follows: We will suppose the time occupied in charging the secondary batteries to be six hours, and that their current is applied to use for the space of two hours over either of the circuits L or L', in which may be included any apparatus adapted for operation by dynamic electricity such as secondary batteries furnish. The toothed wheel I is arranged in such position that its second pin, $i'$, has just ceased to be in contact with the arm H, and therefore six hours will elapse before the first pin, $i$, raises and drops said arm. The current of the primary charging-battery flows from a wire, $q$, in the direction indicated by the arrows No. 2, to the spring P and strip M, and from said strip follows the spring-fingers O and connecting-wires to the positive poles of the secondary batteries S, and, passing through said batteries, leaves their negative poles and traverses the connecting-wires to the spring-fingers O', and thence to the metallic strip M', spring P', and back over the wire $q'$ to the charging-battery. The current will thus flow through all the secondary batteries, charging the same for the space of six hours, at the end of which time the pin $i$ of the wheel I will drop the arm H, to close the circuit of the battery G, as before described, and cause the catch $f$ to release the pin $b$, the spring C causing the cylinder to turn quickly through a quarter-revolution, and the arm E' flying back in time for the catch $f$ to engage the pin $b^2$ and prevent further movement of the cylinder. In this position the cylinder will be so turned that the plates $m$ and $m'$ will have passed out of contact with the springs P and P', and said springs will bear upon the plates $m^2$ and $m^3$, respectively, and the buttons N and N' will be brought in contact with the metallic spring-fingers O' and O, respectively. The charging battery will thus be disconnected from the secondary batteries, and said batteries connected in series and with the wires $r$ and $r'$. The circuit of the charging-battery is not broken by this change of position of the cylinder, as the plates $m^2 m^3$ are connected by the wire $m^4$, and, owing to the obliquity of the separating-spaces, the springs P and P' make contact with the said plates before their contact with the plates $m$ and $m'$ is broken. It will thus be seen that the charging-circuit may include, if desired, any suitable electrical apparatus and operate the same without interruption from the shifting of the cylinder.

The wire $m^4$ should preferably include a resistance (not shown in the drawings) equal to that of one of the secondary batteries, in order that the resistance in the charging-circuit at that point will not be raised by its disconnection from the secondary batteries. Now, supposing the switches R and R' to connect said wires with circuit L, the current of the secondary batteries will flow as follows, viz: from the positive pole of the battery $S^6$, in the direction of the arrow No. 3, to its connected spring-finger O; thence to a button, N', obliquely over a wire, $n$, to a button, N; thence over a spring-finger, O', to the negative pole of battery $S^5$, through said battery to its positive pole, and thence to a spring-finger, O, connected therewith, and by a route similar to that before described to and through the battery $S^4$, and so on until it finally passes, with accumulated tension, to the negative pole of battery S', where it will split, a portion passing direct to the line over wire $r^2$ and a portion going through the battery, joining the battery-current, and passing from the positive pole of the battery S' to the binding-post of its connected spring-finger O, and thence over the wire $r'$ and switch R to the line L, the $+$ terminal of which is connected with said switch, and, passing over the circuit, it returns to the switch R, and over wire $r$ to the rearmost spring-finger, O', which is in connection with the negative pole of the battery $S^6$.

It will be readily understood that any apparatus adapted for operation by dynamic electricity may be interposed in the circuit L and operated from the current of the secondary batteries; or by means of the switches R and R' the current may be directed over the circuit the terminals of which are indicated by L'. At the end of two hours the second pin, $i'$, of the wheel I will drop the arm H, closing circuit-battery G, the lever E' will be operated, the catch $f$ release its pin $b^2$ and engage the pin $b'$. As the cylinder is turned another quarter-revolution, bring now the strip M' in contact with the fingers O and the strip M in contact with the fingers O', when the secondary batteries will be again connected in multiple arc with the charging-battery and the charging will continue for six hours, at the end of which time the cylinder will be turned another quarter-revolution and the secondary batteries will be connected in series with the line. In this connection the buttons N will be in contact with the fingers O and the button N' with the fingers O', the direction of the oblique wires $n$ will be reversed, and the current of the secondary batteries will flow over the line in a direction the reverse of that it followed when the batteries were connected with the line as first described. This alternate connection of the secondary batteries with the charging-battery and with the line or working circuit will continue as long as the spring C is in condition to turn the cylinder properly. The spring may be wound up at any time by simply turning the disk B by hand in the direction of the arrow No. 1, leaving the catch $f$ in engagement with the desired pin when the winding up is finished.

The diagram Fig. 2 illustrates the manner in which the currents from a number of series of secondary batteries may be discharged successively upon a working-circuit, said series of batteries being charged from a single charging-circuit.

The letters Q Q' indicate the terminals of the charging-circuit, that marked with the sign $+$ (plus) leading from the positive pole of the charging-battery, being connected by branches $l'\ l^2\ l^3$ with the springs P, respectively, of the several connecting and disconnecting apparatus, which are numbered respectively 1 2 3, while the terminal marked $-$ (minus) leads from the negative pole of the charging-battery, and is connected by branches $l^4\ l^5\ l^6$ to the springs P'. The current passes from the charging-battery, in the direction of the arrow No. 1, over the branches $l'\ l^2\ l^3$ to the springs P, and thence through the secondary batteries, as described in reference to Fig. 1, and back over the springs P', branches $l^6\ l^5\ l^4$, to the terminal Q', and thence back to the charging-battery.

In gear with the train of the clock K' is a wheel, I', having formed in its face three annular series of sockets, $s\ s'\ s^2$, to receive pins similar to the pins $i\ i'$ of the wheel I, Fig. 1. These pins are for operating three different arms of as many circuit-closers, having a similar function to the circuit-closers shown as operated by the clock in Fig. 1, and arranged to close the circuit of the magnets E² E³ E⁴ separately.

In Fig. 2ᵃ is shown a plan view of the three circuit-closing arms and the pin-wheel for operating them.

The letters H² H³ H⁴ indicate the arms, I' the pin-wheel, and $g^3$ $g^4$ $g^5$ denote the wires leading from the several magnets and connecting with the springs $h^4$ $h^5$ $h^6$, arranged under said arms, the same as the spring $h$ is arranged under the arm H in Fig. 1. Beneath these springs is a broad spring, $h^7$, connected by a wire, $g^6$, with one pole of the battery G', the other pole of which is connected by a wire, $g^7$, and suitable branches therefrom to the magnets.

It will be readily understood that the pins may be arranged in the sockets of the wheel I' to operate the arms separately at different periods. These arms extend in front of the wheel, and have their tips bent inwardly toward said wheel, as shown at $a$ $a'$ $a^2$, so that said tips will come in the paths respectively of pins arranged in the different series of sockets in wheel I'— that is, the tip of the arm H² stands in the path of pins in the outer series, $s$, the tip of arm H³ in the path of pins in the next inner series of sockets, and the tip of arm H⁴ in that of pins in the innermost series. Now we will suppose the cylinders A of the connecting and disconnecting devices to be set as shown in Fig. 1—that is, with the metallic spring-fingers O and O' respectively in contact with the continuous metallic strips M and M'—and in this position, as before explained, the current of the charging-battery will flow in the direction of the arrow No. 1 and through all the secondary batteries to charge the same. Let us further suppose that the wheel I' is arranged to make one revolution in twelve hours, and the first series of secondary batteries is to have its current thrown upon the circuit L², in which are the electric lamps X, at the end of six hours. The two pins indicated by black spots, Fig. 2, are so arranged that the first pin shall lift and drop the arm H⁴ at the end of the six hours. This will cause the circuit of the battery G' to be momentarily closed over the magnet E², wire G⁵, spring $h^6$, spring $h^7$, and wire $g^6$, causing the magnet to attract its armature, and permitting the cylinder A of the connecting and disconnecting apparatus No. 1 to be turned one quarter-revolution, disconnecting the secondary batteries from the charging-circuit, and connecting them in series with the lamp-circuit L², through branches L³ L⁴, precisely as described heretofore with reference to Fig. 1. The pins being arranged to allow the secondary batteries to remain upon the working-circuit two hours, at the end of that time the second pin in the innermost series of sockets will again drop the arm H⁴ to shift the cylinder A, No. 1, to again connect its series of secondary batteries with the charging-circuit. Simultaneously with the dropping of the arm H⁴ by the second pin of the innermost series the first pin of the intermediate series, $s'$, will drop the arm H³, thus, as will be understood, causing the series of secondary batteries controlled by the apparatus No. 2 to be disconnected from the charging-circuit and connected with the lamp-circuit simultaneously with the withdrawal of the first series of secondary batteries from said lamp-circuit. After two hours' connection with the lamp-circuit the second series of secondary batteries will be withdrawn therefrom by the action of the second pin on arm H³, and the third series of secondary batteries will be disconnected from the charging-circuit and connected in series with the lamp-circuit by the action of the first pin in the outer series of sockets in the wheel I, said pin lifting and dropping from the arm H², and this last series will be in turn withdrawn from the lamp-circuit and reconnected with the charging-circuit by the action of the second pin, which operates the arm H². The devices will all be now in the same positions as when the first charging of all the series first commenced. At the end of six hours, the same operations as described will be repeated.

It will be understood that the wheel I' may be arranged to make a complete revolution in any desired number of hours, and instead of six the number of hours during which all the batteries are withdrawn from the lamp circuit may be any number desired; and so, also, by a proper arrangement of the lifting and dropping pins, the period for which each series of secondary batteries is connected with the lamp-circuit, or any other working-circuit, may be regulated, the pin-holes or sockets being preferably arranged one hour apart, but not necessarily so.

It will be observed that the continuity of the charging-circuit is not all interrupted by the disconnection of any series of secondary batteries therefrom, as the charging-circuit is connected by separate and independent branches with each connecting and disconnecting apparatus.

A multiple connecting and disconnecting apparatus as now described insures the connection of the several series of secondary batteries successively with the working-circuit, in order that a continuous dynamic electrical current may flow thereupon during any predetermined period, and obviates the necessity of personal attention and liability of failure in the service through forgetfulness or inattention to proper switching on and off the batteries.

In Fig. 3 the arrangement of the connecting and disconnecting apparatus is substantially the same as shown in Fig. 2, and I have therefore omitted the automatic circuit-closers and shown the magnet circuit-wires as simply leading to the clock. The main purpose of this figure is simply to illustrate the manner of utilizing for the charging-circuit a circuit which is normally charged and used for another distinct and independent purpose.

The letter R indicates the wires of a fire-alarm circuit which is normally charged by a battery, T. These wires connect with the terminals Q and Q', which extend from the multiple connecting and disconnecting apparatus, and also with the various alarm-boxes designated by the letter $u$, with the gong U', and with suitable apparatus at the main office, (indicated by the letter U.)

Connecting and disconnecting apparatus may be arranged at several stations in a charging-circuit of this kind, two being shown and designated by the letters Z and Z' in the drawings, in which the working-circuits are simply indicated in dotted lines, it being understood that they are arranged substantially as in Figs. 1 and 2, and may be used for maintaining electric lights, or any other purpose for which dynamic electricity such as supplied by secondary batteries is required.

In Fig. 3 I have shown a resistance, $Z^2$, connected in the main charging-circuit around the connecting and disconnecting apparatus. This resistance has the function of regulating the extent to which the several series of secondary batteries become charged. When they are charged to a point of resistance greater than that of the resistance $Z^2$, then the current will mainly or entirely flow through said resistance without interrupting the operativeness of the main circuit. Such a resistance may be used in connection with every connecting and disconnecting apparatus.

In the specification and claims I mean by the "working-circuit" that circuit over which the currents of the secondary batteries are applied to use, and as each connecting and disconnecting apparatus, as described, is, in fact, an automatic compound switch, I have used the latter name in referring to such devices in the claims.

What I claim is—

1. The combination, with a series of secondary electric batteries, a primary charging-circuit, and a separate or working circuit, of automatic time mechanism, electric circuits, and means, substantially as described, to connect said series of secondary batteries alternately at predetermined periods with the charging-circuit in multiple arc and with the working-circuit in tension series.

2. The combination, with one or more series of secondary electric batteries, a primary or charging circuit, and a secondary or working circuit, of automatic time switches and circuits, substantially as described, arranged to connect said two or more series of secondary batteries successively at predetermined periods alternately with the charging-circuit in multiple arc and with the working-circuit in tension series.

3. The combination, with a series of secondary batteries, a primary or charging circuit, and a separate working-circuit, of a compound automatic switch controlled by an electro-magnet, electric circuits, and means, substantially as described, arranged to connect said series of secondary batteries alternately with the charging-circuit in multiple arc and with the working-circuit in tension series.

4. The combination, with two or more series of secondary batteries, a primary or charging circuit, and a separate working-circuit, of two or more compound switches controlled by separate electro-magnets, and conductors arranged, substantially as described, to connect said two or more series of secondary batteries, respectively, alternately with the charging-circuit in multiple arc and with the working-circuit in tension series.

5. The combination, with two or more series of secondary batteries, a primary or charging circuit, and a separate or working circuit, of two or more compound switches and conductors, substantially as described, arranged to connect said series of secondary batteries, respectively, alternately with the charging-circuit in multiple arc and with the working-circuit in tension series, electro-magnets, and means, substantially as described, for controlling said compound switches, respectively, and time mechanism arranged to direct electric currents over the coils of said magnets at predetermined intervals, substantially as described.

6. The combination, with one or more series of secondary batteries, a normally-closed electric circuit employed for operating electrical apparatus distinct from and independent of said secondary batteries, and a separate working-circuit arranged to receive the current of said batteries, of one or more automatic switches, conductors, and mechanism, substantially as described, for connecting the secondary batteries alternately with the normally-closed circuit in multiple arc without breaking said circuit and with the working-circuit in tension series.

7. The combination, with one or more series of secondary batteries, a primary or charging circuit, and one or more separate working-circuits, of one or more automatic compound switches, conductors, and mechanism, substantially as described, for connecting said series of batteries, respectively, alternately with the charging-circuit in multiple arc and with a working-circuit in tension series, and suitable hand-switches for connecting a desired working-circuit with said secondary batteries.

In testimony whereof I affix my signature in presence of two witnesses.

CHARLES E. BUELL.

Witnesses:
W. B. HALE,
WM. H. BATES.